United States Patent
Zaidi et al.

(10) Patent No.: US 9,515,932 B2
(45) Date of Patent: Dec. 6, 2016

(54) METHODS, SYSTEMS, AND COMPUTER READABLE MEDIA FOR CONDUCTING PRIORITY AND COMPLIANCE BASED MESSAGE TRAFFIC SHAPING

(71) Applicant: Oracle International Corporation, Redwood Shores, CA (US)

(72) Inventors: Syed Mohsin Reza Zaidi, Cary, NC (US); Brian John Hassink, Cary, NC (US); Mark Edward Kanode, Apex, NC (US); David Michael Sprague, Raleigh, NC (US); Komal G. Khungar, Morrisville, NC (US); Pankaj Goyal, Cary, NC (US); Jonathan James Palmer, Durham, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/616,611

(22) Filed: Feb. 6, 2015

(65) Prior Publication Data
US 2016/0234119 A1    Aug. 11, 2016

(51) Int. Cl.
*H04L 12/28* (2006.01)
*H04L 12/801* (2013.01)
*H04L 12/825* (2013.01)
*H04L 12/873* (2013.01)
*H04L 12/54* (2013.01)

(52) U.S. Cl.
CPC .............. *H04L 47/12* (2013.01); *H04L 12/54* (2013.01); *H04L 47/25* (2013.01); *H04L 47/522* (2013.01)

(58) Field of Classification Search
CPC ........ H04L 47/12; H04L 47/25; H04L 47/522; H04L 12/54
See application file for complete search history.

(56) References Cited

U.S. PATENT DOCUMENTS 7,088,710 B1 *  8/2006  Johnson .................. H04L 12/64
                                                                     370/357
7,617,285 B1    11/2009 Hartmann
(Continued)

OTHER PUBLICATIONS

Commonly-assigned, co-pending U.S. Appl. No. 14/827,766 for "Methods, Systems, and Computer Readable Media for Conducting Adaptive Event Rate Monitoring," (Unpublished, filed Aug. 17, 2015).

(Continued)

*Primary Examiner* — Clemence Han
(74) *Attorney, Agent, or Firm* — Jenkins, Wilson, Taylor & Hunt, P.A.

(57) ABSTRACT

According to one aspect, the disclosed subject matter describes herein a method that includes aggregating, by an egress function, message traffic directed to a target server entity from each of a plurality of ingress functions and procuring, by the egress function, dynamic update data that includes a message processing capacity threshold value associated with the target server entity and an aggregated message traffic rate corresponding to the message traffic received from the plurality of ingress functions. The method further includes sending the dynamic update data to each of the plurality of ingress functions and adjusting, by each of the ingress functions, an outgoing message traffic rate directed to the target server entity in accordance with the dynamic update data.

23 Claims, 5 Drawing Sheets

(56) References Cited

U.S. PATENT DOCUMENTS

| | | | |
|---|---|---|---|
| 8,144,588 B1* | 3/2012 | Ma | H04L 49/90 370/235 |
| 8,194,548 B2* | 6/2012 | Diab | H04L 47/10 370/230.1 |
| 8,615,217 B2 | 12/2013 | Ravishankar et al. | |
| 2004/0136379 A1* | 7/2004 | Liao | H04L 12/5695 370/395.21 |
| 2005/0005021 A1* | 1/2005 | Grant | H04L 47/10 709/232 |
| 2005/0100011 A1* | 5/2005 | Chiruvolu | H04L 47/10 370/389 |
| 2007/0286202 A1 | 12/2007 | Dos Remedios et al. | |
| 2008/0028068 A1* | 1/2008 | Nochta | H04W 28/08 709/224 |
| 2008/0291927 A1* | 11/2008 | Yong | H04L 47/10 370/400 |
| 2009/0222573 A1* | 9/2009 | Grossner | H04L 47/10 709/235 |
| 2011/0040845 A1 | 2/2011 | Cai et al. | |
| 2011/0158090 A1 | 6/2011 | Riley et al. | |
| 2011/0176418 A1* | 7/2011 | Gershinsky | H04L 47/12 370/230.1 |
| 2012/0005367 A1* | 1/2012 | Bettink | H04L 47/41 709/233 |
| 2013/0039176 A1 | 2/2013 | Kanode et al. | |
| 2013/0039179 A1* | 2/2013 | Chapman | H04L 47/22 370/230.1 |
| 2013/0275583 A1* | 10/2013 | Roach | H04L 43/08 709/224 |
| 2014/0198644 A1 | 7/2014 | Basilier et al. | |

OTHER PUBLICATIONS

Diameter Solution SuiteTM—The Smarter Diameter Signaling Controller, Diametriq, http://diametriq.com/wp-content/uploads/downloads/2015/02/Diameter-Solution-Suite.pdf, pp. 1-4 (Feb. 2015).

F5 Traffix Signaling Delivery Controller, Datasheet, http://www.f5.com/pdf/ products/signaling-delivery-controller-datasheet.pdf, pp. 1-11 (2014).

\* cited by examiner

METHODS, SYSTEMS, AND COMPUTER READABLE MEDIA FOR CONDUCTING PRIORITY AND COMPLIANCE BASED MESSAGE TRAFFIC SHAPING

TECHNICAL FIELD

The subject matter described herein relates to the classification and management of network message traffic. More particularly, the subject matter described herein relates to systems, methods, and computer readable media for conducting priority and compliance based message traffic shaping.

BACKGROUND

Message traffic shaping solutions are currently utilized by network administrators in order to manage message bandwidth in an efficient manner as well as to protect network resources from congestion related failures. However, many traffic shaping solutions that are currently deployed in networks arbitrarily discard messages in accordance with quantity or volume as opposed to leveraging traffic-related classifications or metrics. For example, present traffic shaping solutions may fail to consider factors such as non-compliant operating behavior associated with a message origination source. Lastly, many present traffic shaping solutions may experience inefficiencies upon being implemented in existing network infrastructures due to lack of scalability and/or being restricted to a single network element or device.

Accordingly, there exists a need for systems, methods, and computer readable media for conducting priority and compliance based message traffic shaping.

SUMMARY

Methods, systems, and computer readable media for conducting priority and compliance based message traffic shaping are disclosed. According to one aspect, the subject matter described herein comprises a method that includes aggregating, by an egress function, message traffic directed to a target server entity from each of a plurality of ingress functions and procuring, by the egress function, dynamic update data that includes a message processing capacity threshold value associated with the target server entity and an aggregated message traffic rate corresponding to the message traffic received from the plurality of ingress functions. The method further includes sending the dynamic update data to each of the plurality of ingress functions and adjusting, by each of the ingress functions, an outgoing message traffic rate directed to the target server entity in accordance with the dynamic update data.

The subject matter described herein may be implemented in hardware, software, firmware, or any combination thereof. As such, the terms "function" or "module" as used herein refer to hardware, software and/or firmware components for implementing the feature(s) being described. In some embodiments, a function and/or module may comprise a chipset (e.g., a microprocessor) including a hardware processor unit that executes a software algorithm stored in embedded (non-transitory) memory. For example, a function or module may comprise a single message processor that receives and sends traffic data via communication ports and configured to perform message processing tasks on the communicated traffic data (e.g., packet traffic). In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for conducting priority and compliance based message traffic shaping. In some embodiments, the disclosed subject matter includes a traffic shaping element that comprises plurality of ingress functions, each of which utilizes feedback information from an egress function in order to "shape" and/or manage the message traffic originating from a plurality of client entities. As used herein, traffic shaping refers to the reduction (e.g., discarding and/or rerouting) of packet message traffic processed by a traffic shaping element (e.g., a network routing element). In some embodiments, the egress function periodically may provide, to each of the ingress functions, a traffic shaping profile (i.e., static configuration information) and/or a target message discard rate (i.e., dynamic update data) that may be used by each receiving ingress function to adjust the rate of outgoing message traffic directed to a target server entity. Notably, the ingress functions may be configured to utilize the dynamic update data (and stored traffic shaping profile) to adjust the outgoing message traffic rates. In some embodiments, the egress function included in the traffic shaping element may be configured with an operations, administration, and maintenance (OAM) module or component that is responsible for providing the traffic shaping profile (i.e., static configuration information which may include a traffic shaping policy, client compliance limits, and message priority designations as described below) to the ingress functions. Alternatively, the disclosed subject matter may utilize a separate and/or dedicated OAM server entity to provide the traffic shaping profile to the ingress functions.

As used herein, "client compliance designation" refers to data that specifies the conditions in which a client entity may be designated as either a compliant (i.e., well-behaved) client entity or a non-compliant client entity with respect to the message traffic rate originated by the sending client entity. Notably, message traffic received from client entities designated as being compliant is afforded higher precedence (e.g., preferential treatment within a message priority classification) when the traffic shaping is conducted. More specifically, traffic shaping may be customized via the traffic shaping profile and/or dynamic update data (see below) provided to ingress functions by the egress function. In some embodiments, the traffic shaping profile may include a traffic shaping policy that indicates a priority-within-client compliance policy, a client compliance-within-priority policy, a priority only policy, a client compliance only policy, and the like.

In some embodiments, client compliance designations may be conducted by "coloring" message traffic in order differentiate between compliant client entities and non-compliant client entities. For example, message traffic originating from compliant client sources may be colored "green" whereas traffic received from non-compliant sources may be colored "yellow". Notably, color does not imply an end-to-end quality of service, but rather that in the event of congestion and based on the specified traffic shaping profile, message traffic from non-compliant clients can be discarded (or re-routed) by the ingress function(s) prior to message traffic from compliant clients (e.g., see FIG. 3).

Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
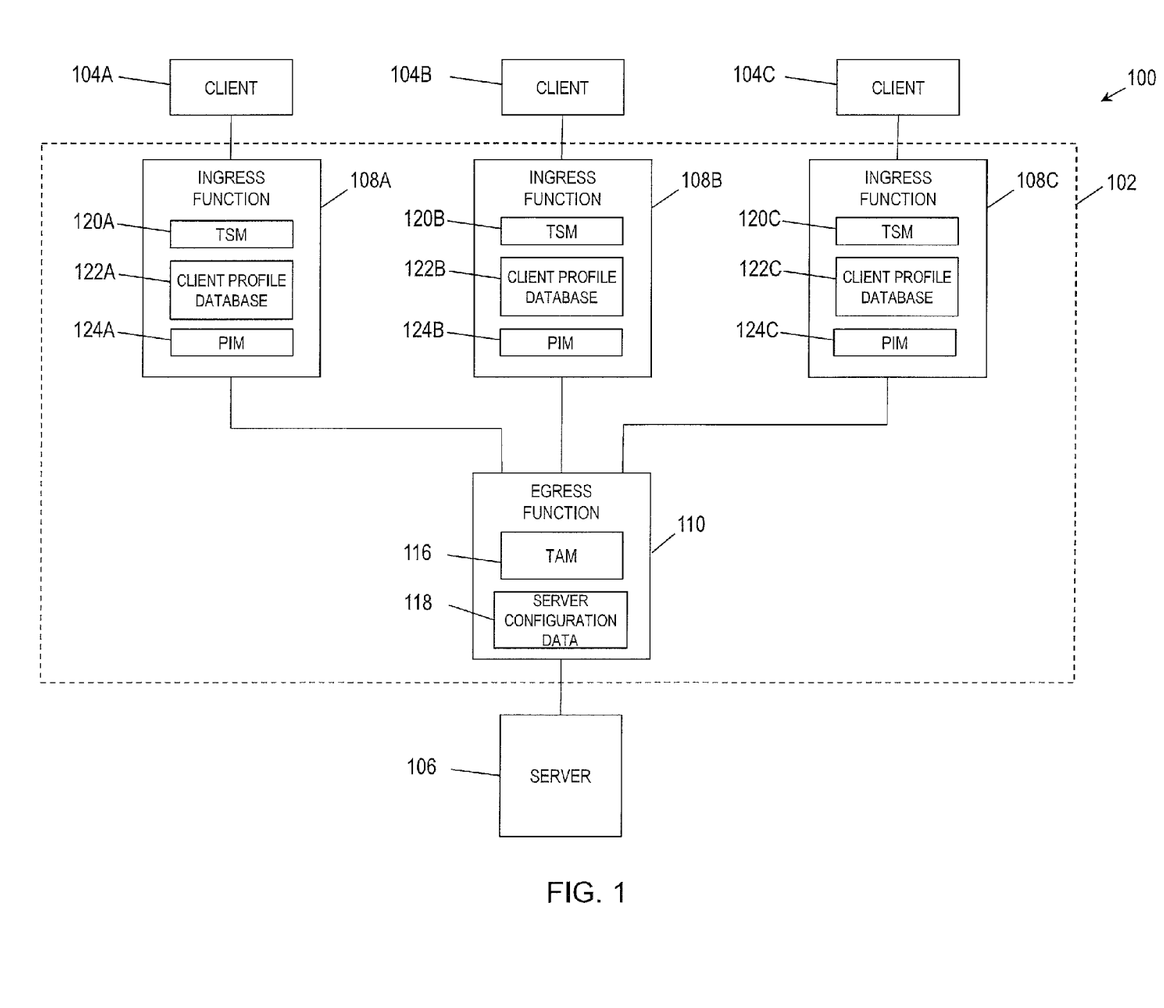
FIG. 1 is a block diagram illustrating a system for conducting priority and compliance based message traffic shaping according to an embodiment of the subject matter described herein.

FIG. 1 is a block diagram illustrating an exemplary traffic shaping element 102 that facilitates network traffic communications between a plurality of client entities 104A-C and a target server entity 106. In some embodiments, traffic shaping element 102 may include a plurality of ingress functions 108A-C and an egress function 110 that are communicatively connected to conduct the disclosed priority and compliance based message traffic shaping process. Although FIG. 1 depicts three clients and a single server for the sake of simplicity and explanation, traffic shaping element 102 may be configured to support additional client entities and server entities without departing from the scope of the disclosed subject matter. In addition, although the following disclosure related to FIG. 1 describes ingress functions 108A-C and egress function 110 as separate message processors, the disclosed subject matter includes a degree of scalability that affords multiple embodiments. For example, in some embodiments, each of ingress functions 108A-C and egress function 110 may comprise a separate and distinct network routing element (e.g., separate Diameter signaling routers) that are communicatively connected via wired and/or wireless network connections. In some alternate embodiments, each of ingress functions 108A-C and egress function 110 may include modules existing in a single message processor within a network routing element (e.g., see FIG. 2). In some alternate embodiments, the ingress functions and egress functions may include message processors that are distributed across (i.e., reside on) multiple coordinating DSRs. For example, a first message processor and second message processor may belong to a first DSR and operate as ingress functions that are connected to client entities and a third message processor located in a second DSR. Notably, the third message processor on the second DSR may operate as an egress function that is connected to a server entity. In some embodiments, the disclosed subject matter can be simultaneously deployed at a plurality of the abovementioned levels (i.e., a combination of the traffic shaping element embodiments indicated above). For example, the disclosed traffic shaping mechanism may be configured to operate i) in multiple modules within a single message processor, ii) between multiple message processors in a network routing element, such as a DSR, and iii) between multiple network routing elements at the same time.

Although each of FIG. 1 logically depicts ingress functions and egress functions as separate logical entities, the differentiation between the two types of functions may be conceptual and not based on hardware and/or software boundaries or restrictions. Notably, in some embodiments, an ingress function may be configured to perform both ingress and egress functionalities. As a practical example, a message processor may comprise an ingress function that includes a first designated part that communicates and aggregates message traffic in a manner similar to an egress function and a second designated part that is configured to conduct traffic shaping in a manner similar to the aforementioned ingress function(s). Using FIG. 1 as an example, suppose an ingress function 'IF1' (not shown) may physically comprise both ingress function 108A and egress function 110. In such an embodiment, this ingress function IF1 would still be communicatively connected to ingress functions 108B-C. Notably, the components (i.e., ingress function 108A and egress function 110) of ingress function IF1 are executing in the same manner described above but at a lower level (i.e., at a different scale) than ingress egress function IF1. This conceptual differentiation (into lower level elements) or integration (into higher level elements) is useful when describing distinct embodiments that can exist simultaneously at different levels of abstraction (e.g., an embodiment that describes a message processor protecting itself and having software modules serving as the IF(s) and/or EF(s), and an embodiment that describes a DSR node protecting a remote server and having individual message processors serving as IF(s) and/or EF(s) but that does not need to describe that each message processor is also protecting itself).

In some embodiments, traffic shaping element 102 manages and facilitates the communication of message traffic (e.g., packet traffic and/or frame traffic) between client entities 104A-C and server entity 106. Exemplary client entities and server entities may include mobility management entities (MMEs), policy and charging enforcement functions (PCEFs), home subscriber servers (HSS), and policy control and charging rules functions (PCRFs). In some embodiments, one or more client entities 104 may direct message traffic (e.g., Diameter request messages, RADIUS request messages, etc.) toward server entity 106 via traffic shaping element 102. Notably, an ingress function 108 may be configured to receive the message traffic from a client entity 104 prior to forwarding the message traffic to egress function 110. In some embodiments, ingress function 108 may utilize a traffic shaping module (TSM) 120 to shape the received message traffic in accordance with a traffic shaping profile and/or dynamic update data provided by egress function 110 (described in further detail below). In some embodiments, TSM 120 may receive the traffic shaping profile (i.e., static configuration information) from an OAM server entity (not shown in FIG. 1) that includes client compliance designation information and message priority designation information. Each of ingress functions 108A-C may also include a client profile database 122 that is configured to store compliance designation information for each client entity 104 that communicates with the ingress function. For example, client profile database 122 may include entries that map client entity identifiers (e.g., a unique alphanumeric identifier assigned to each client entity) to various compliance designation levels. For example, the compliance designation data for client entity 104A may include a unique identifier (e.g., BC1237) that is mapped to a compliance designation level indicating a commitment that message traffic amounting to 5000 messages per second (mps) will be preferred for service. As long as client entity 104A originates a traffic rate equal to or less than 5000 mps, client entity 104A will be designated as a "compliant client" and its received message traffic will be designated as "compliant." In some embodiments, a receiving ingress function 108A may "color" the message traffic from a compliant client entity as "green". In the event client entity 104A sends message traffic at a rate that exceeds the committed rate of 5000 mps, then receiving ingress function 108A may designate client entity 104A as a "non-compliant client" and its received message traffic as "non-compliant." In some embodiments, a receiving ingress function 108A may "color" the message traffic from a non-compliant client as "yellow". Depending on the embodiment, ingress function 108 may be configured to either i) classify all traffic received from a non-compliant client as a non-compliant message traffic or ii) classify only the message traffic in excess of a committed service rate (e.g., message traffic in excess of 5000 mps) from a non-compliant client as non-compliant.

Each of ingress functions 108A-C may further include a packet inspection module (PIM) 124 that can be used to inspect the contents of messages received from client entities. For example, PIM 124 may be utilized to determine the source and destination of the message. PIM 124 may also be used by ingress function 108 to assess the contents of a message or the type of message received. Notably, PIM 124 may be configured to assign a priority level to the received message based on this assessment.

In some embodiments, egress function 110 is configured to receive message traffic (e.g., both compliant and non-compliant message traffic) from ingress functions 108A-C. Egress function 110 may include a traffic assessment module (TAM) 116 and a server configuration data store 118. In some embodiments, TAM 116 enables egress function 110 to determine whether the received message traffic directed to target server entity 106 by ingress functions 108A-C can be adequately handled and/or processed by target server entity 106 (discussed in detail below). Likewise, server configuration data store 118 in egress function 110 may be configured to contain certain operation parameters associated to a plurality of server entities (e.g., server entity 106) serviced by traffic shaping element 102. For example, server configuration data store 118 may include a database that maps identifiers corresponding to server entities and message processing capacity threshold values (e.g., target rate values that represent the maximum message processing capacity rates handled by each server entity).

In some embodiments, the message processing capacity threshold values stored in data store 118 may include values that vary based on one or more dynamic conditions. For example, the dynamic conditions may include, but not limited to, pending transactions, communication failures, destination server feedback, and the like. Notably, each of these dynamic conditions (or combinations thereof) would result in some variation to the message processing capacity threshold value associated with a destination server entity, such as i) upwards or downwards throttling in order to maintain an equilibrium state with respect to pending transactions, ii) upwards throttling to the actual rate should an ingress function no longer be able to communicate with the egress function instructing the ingress function to discard traffic, and iii) downwards throttling until the destination server stops indicating an existing overload condition. As an example, if server entity 106 indicates that it is experiencing a CPU overload condition, then egress function 110 may be configured to dynamically establish a message processing capacity threshold value to server entity 106 at a rate that is less than the originally configured maximum target rate. For example, if server entity 106 is still reporting that it is approaching or experiencing a CPU overload condition even after the aggregated message traffic from the ingress functions are complying with the originally established message processing capacity threshold value, egress function 110 may be configured to set the target rate to a value amounting to a lower percentage (e.g., 75%) of the configured maximum target rate. After making this adjustment, egress function may be configured to send the ingress functions feedback update data accordingly. Notably, if server entity 106 is still reporting the existence of an overload condition, egress function may throttle down 110 the message traffic even further (e.g., to 50% of the configured maximum).

In some embodiments, egress function 110 may be configured to utilize TAM 116 to receive and aggregate message traffic sent to server entity 106 from ingress functions 108A-C. For example, TAM 116 may be used to calculate an aggregated message traffic rate that represents the amount of traffic received from ingress functions 108A over a period of time (e.g., messages per second). After the aggregated traffic rate is determined, egress function 116 may access server configuration data store 118 to procure a message processing capacity threshold value associated with server entity 106. Egress function 116 may subsequently utilize TAM 116 to compare the procured aggregated message traffic rate and message processing capacity threshold value to determine if target server entity 106 is susceptible to becoming overloaded (e.g., if the aggregated traffic rate is greater than the message processing capacity threshold value). If the aggregated message traffic rate does not exceed the threshold value, then egress function 110 may forward all of the received message traffic directed to server entity 106. However, if the aggregated message traffic rate exceeds the threshold value, then egress function 110 may utilizes TAM 116 to generate a traffic shaping profile.

In some embodiments, TAM 116 may provide an aggregate target message discard rate. The target message discard rate may be determined based on the amount (or percentage) in which the aggregated message traffic exceeds the threshold value. For example, TAM 116 may determine the percentage of message traffic contribution from each of ingress functions 108A-C and apply each of said percentages to the amount in which the aggregated message traffic rate exceeds the threshold value. The result of this determination produces a target message discard rate for each of ingress functions 108A-C. In other embodiments, each of the of ingress functions 108A-C may be configured to determine its own individual target message discard rate.

In some embodiments, the traffic shaping profile can also include message priority designations and client compliance designations which may be used by ingress functions to shape message traffic received from client entities. In some embodiments, an egress function (configured with a local OAM component) may be configured to provide the message priority designations and/or the client compliance designations to the ingress functions as part of the traffic shaping profile. In other embodiments, the message priority designations and/or the client compliance designations are separately provided to the ingress functions as static configuration information by an OAM server entity (not shown). For example, message priority designations may include predefined message priority levels ranging, for example, from Priority 0 ("P0") to Priority 3 ("P3"). Although the following example describes priority level "P0" as being least important and priority level "P3" being most important, any range of priority level designations may be used without departing from the scope of the disclosed subject matter. Likewise, the traffic shaping profile may include client compliance designations comprising a "compliant" designation level and "non-compliant" designation level, either of which can be assigned to a client entity based on its traffic generation behavior. Notably, a traffic shaping profile may include various traffic shaping group designations, each of which comprises a combination of an aforementioned message priority designation and a client compliance designation. For example, exemplary traffic shaping group designations include, but not limited to, Priority0:Compliant, Priority1:Compliant, Priority2:Compliant, Priority3:Compliant, Priority0:Non-compliant, Priority1:Non-compliant, Priority2:Non-compliant, and Priority3:Non-compliant. Furthermore, the traffic shaping profile may also specify a traffic shaping policy that includes a priority within compliance policy (i.e., message traffic is prioritized in accordance with client compliance first, then message priority is considered), a compliance within priority policy (i.e., message traffic is prioritized in accordance with message priority first, then client compliance is considered), a priority only policy, or a client compliance only policy. Notably, an ingress function may utilize the traffic shaping policy to prioritize message traffic based on a specified interrelationship between message priorities and/or client entity compliance.

After a traffic shaping policy is established (e.g., by a system administrator), egress function 110 and/or an OAM server entity may provide a traffic shaping profile (i.e., static configuration information), which includes the traffic shaping policy, to ingress functions 108A-C. Upon receiving the traffic shaping profile (which includes the traffic shaping policy and the priority and compliance designations), each of ingress functions 108A-C may initiate the shaping the message traffic received from clients entities 104A-C. For example, as message traffic is received from client entity 104A, ingress function 108A may utilize packet inspection module (PIM) 124A to determine the source and destination of the received message (e.g., client entity 104A and server entity 106) and the priority level of the message. Using this information, ingress function may utilize TSM 120A to group and classify all of the traffic received from client 104A. For example, TSM 120A may organize the received message traffic originating from client 104A and directed to server entity 106 into different priority-compliance designation groups. An example of this grouping is described below and illustrated in FIG. 3.

In some embodiments, egress function 110 may be configured to provide dynamic update data based on the aggregated message traffic received from ingress functions 108A-C. Specifically, TAM 116 in egress function 110 may procure and forward the aggregated message traffic rate and the message processing capacity threshold value (i.e., the target rate of a destination server). Using this information, each ingress function may calculate a total aggregate discard rate as well as the amount (e.g., percentage) of traffic in which the ingress function contributes to the overall aggregate message traffic rate. Likewise, the ingress function may then, in turn, determine an individual target discard rate using the information calculated above.

As an example of ingress functions determining their own individual target discard rate, suppose ingress functions 108A-C respectively send traffic at rates of 6000 mps, 3000 mps, and 1000 mps to egress function 110. Egress function 110 aggregates the traffic and determines the aggregated message traffic rate equates to 10,000 mps. Egress function 110 (e.g., via TAM 116) may access server configuration data 118 then procure/determine the message processing capacity threshold value (i.e., a target rate) associated with server entity 106. Afterwards, egress function 110 may forward the aggregated message traffic rate and the message processing capacity threshold value to each of ingress functions 108A-C. Using this received information, each ingress function may determine the aggregate target message discard rate. For example, ingress function 108A may calculate the aggregate target message discard rate to equal 5000 mps (e.g., 10,000−5000=5000). Ingress function 108A may further determined that it is responsible for sending 60% (e.g., 6000 mps/10,000 mps*100%) of the aggregate message traffic to server entity 106 and thus, is likewise responsible for discarding 60% of the message traffic the whole system needs to discard (e.g., 60%*5000 mps=3000 mps). Ingress functions 108B and 108C may make similar calculations (e.g., to determine an individual discard rate of 1500 mps and 500 mps, respectively). Further, each of ingress functions 108A-C may then respectively apply their own individual target discard rates (e.g., 3000 mps, 1500 mps, and 500 mps) to their respective outgoing message traffic to achieve the message processing capacity threshold value associated with the server entity 106. In alternate embodiments, egress function 110 may provide an aggregate target discard rate to ingress functions 108A-C instead to the targeted rate, which ingress functions 108A-C may utilize to conduct their respective target message discard rates.

After TSM 120A identifies the message traffic to be retained and discarded by ingress function 108A, the retained message traffic is subsequently forwarded to egress function 110 for processing and/or forwarding to target server 106. Notably, if the aggregate message traffic received by egress function 110 from ingress functions 108A-C still exceeds the message processing capacity threshold value associated with server entity 106, egress function 110 may subsequently utilize TAM 116 to generate new dynamic update data to be provided to ingress functions 108A-C as updated feedback.

In some embodiments, each ingress function 108A-C may be configured to determine its respective contribution to each of the specific traffic shaping group designations present within the aggregated message traffic rate directed to egress function 110. More specifically, each ingress function may first calculate an individual aggregate message traffic rate that includes the target message discard rate provided by egress function 110 to the each of the ingress functions 108A-C. Notably, the above procedure can be conducted with additional intelligence with respect to the type of message traffic that is discarded. For example, suppose ingress function 108A is sending Priority0:Non-Compliant traffic at a rate of 2000 mps and Priority2:Compliant traffic at a rate of 4000 mps, ingress function 108B is sending Priority0:Compliant traffic at a rate of 3000 mps, and ingress function 108C is sending Priority0:Compliant traffic at a rate of 1000 mps. Notably, the aggregated message traffic rate as determined by the egress function amounts to 10,000 mps. Also suppose the use of a client compliance-within-priority discard policy is being utilized and that the message processing capacity threshold value is determined to be equal to 5000 mps (similar to the previous example).

In this scenario, egress function 110 may then communicate to ingress functions 108A-C that the determined aggregate traffic group target rates comprise i) 0 mps of Priority0:Non-Compliant traffic, ii) 1000 mps of Priority0:Compliant traffic, and iii) 4000 mps of Priority2:Compliant traffic (or alternatively, the aggregate traffic group target discard rates comprising i) 2000 mps of Priority0:Non-Compliant traffic, ii) 3000 mps of Priority0:Compliant traffic, and iii) 0 mps of Priority2:Compliant traffic.

In yet another embodiment, ingress functions 108A-C may receive from the ingress function the aggregate traffic group rates (i.e., 2000 mps total Priority0:Non-Compliant traffic, 4000 mps of total Priority2:Compliant traffic, and 4000 mps of total Priority0:Compliant traffic) that contributes toward the total aggregated message traffic rate of 10,000 mps. Ingress functions 108A-C may similarly receive the message processing capacity threshold value (i.e., a target rate) equal to 5000 mps in order to perform a stacking procedure (see FIG. 3 and the associated description below for an example of a stacking procedure). Using the received information, ingress function 108A can determine that it is sending 100% (i.e., 2000 mps/2000 mps) of all Priority0:Non-Compliant traffic. Since 2000 mps Priority0:Non-Compliant traffic needs to be discarded globally, ingress function 108A will discard all 2000 of its Priority0:Non-Compliant traffic. Similarly, ingress function 108A may determine that it's sending 4000 mps of Priority2:Compliant traffic. However, since 0% of that Priority2:Compliant traffic needs to be discarded, ingress function 108A does nothing with that traffic. Similarly, ingress function 108B determines that it is sending 75% (i.e., 3000 mps/40000 mps) of all Priority0:Compliant traffic and that 3000 mps Priority0:Compliant traffic needs to be discarded globally. In this scenario, ingress function 108B discards 2250 mps (i.e., 75%*3000 mps) of its Priority0:Compliant traffic. Likewise, ingress function 108C determines that it is sending 25% (i.e., 1000 mps/4000 mps) of all Priority0:Compliant traffic and that 3000 mps of Priority0:Compliant traffic needs to be discarded globally. Accordingly, ingress function 108C discards 750 mps (25%*3000 mps) of its Priority0:Compliant traffic.

Figure 2:
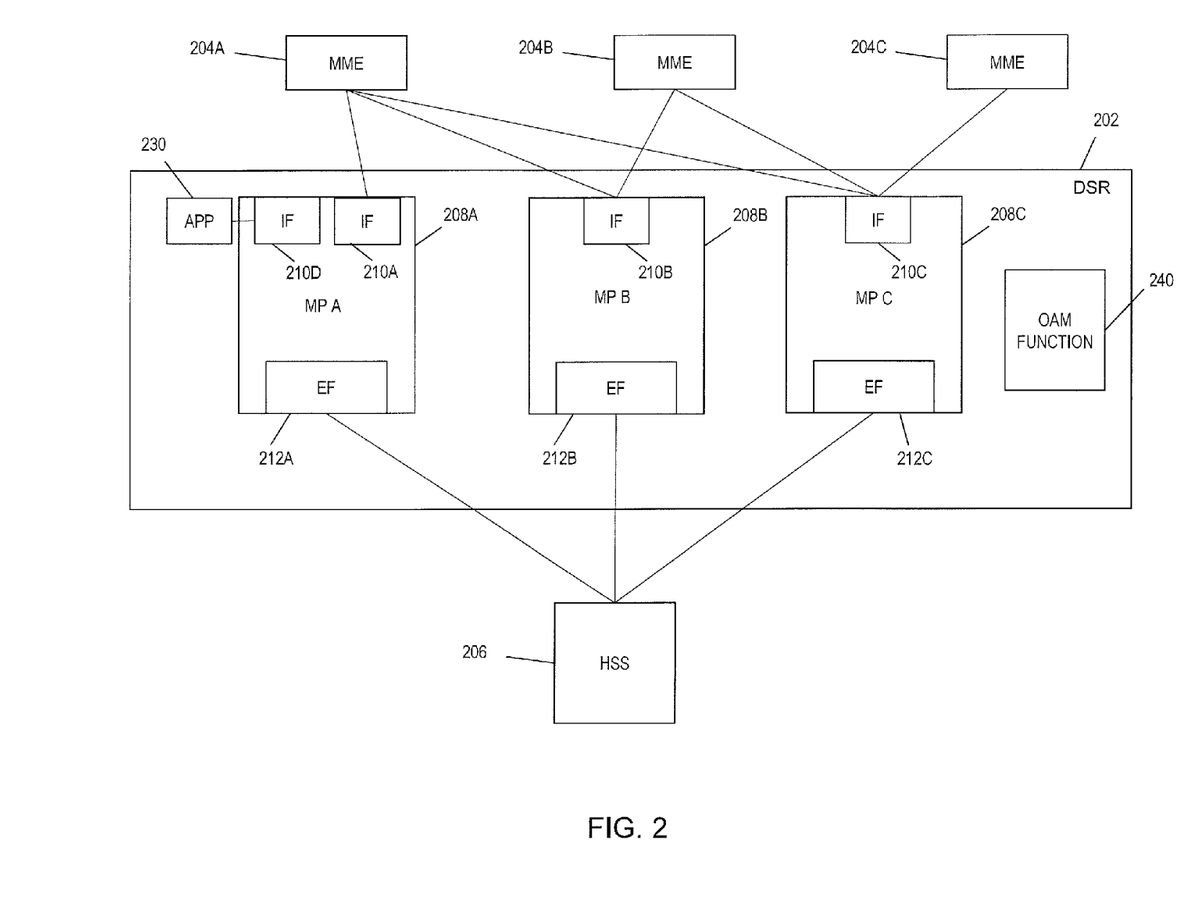
FIG. 2 is a block diagram illustrating an exemplary Diameter signaling router (DSR) according to an embodiment of the subject matter described herein.

FIG. 2 is a block diagram illustrating an exemplary embodiment in which the aforementioned traffic shaping element comprises a Diameter signaling router (DSR) 202 that facilitates network traffic communications between a plurality of mobility management entity (MME) clients 204A-C and a home subscriber server (HSS) 206. In some embodiments, DSR 202 may include a plurality of message processors 208A-C, each of which includes one or more ingress functions 210 and one or more egress functions 212. Although not depicted, ingress functions 210 and egress functions 212 include the same internal modules and/or components as shown in FIG. 1 (see ingress functions 108 and egress function 110) and capable of performing their respective functionalities. In some embodiments, ingress function(s) 210 and egress function(s) 212 are communicatively connected in the routing layer. It should be noted that DSR 202 and its components (e.g., message processors, ingress functions, and egress functions) described herein constitute a special purpose computer that improves the technological field pertaining to packet traffic management by providing a unique mechanism for dynamic congestion control based on message priority and the behavior of the message originator. In some embodiments, DSR 202 may also include an OAM server element or function 240 that may function as central storage for static configuration data. In some embodiments, OAM server element 240 may be hosted by a computer server machine or other network element. Notably, all message processors (e.g., message processors 212A-C) in DSR 202 may share and be communicatively connected to OAM server element 240. Although FIG. 2 depicts a single OAM function 240, DSR 202 may include a plurality of active-standby OAMS that that collectively service all of the message processors without departing from the scope of the disclosed subject matter. In some embodiments, OAM server element 240 may serve as a persistent central storage that may be accessed and/or interfaced by a system administrator (e.g., via a command line interface (CLI) or a graphical user interface (GUI)). In some embodiments, the system administrator may validate and store the static configuration data in OAM server element 240. In the event multiple OAMs are utilizes, the static configuration data may be replicated among the OAM servers upon reboot and/or a periodic basis in order to ensure all of the OAMs have the latest static configuration data.

In some embodiments, message processors 208A-C are communicatively connected with each other via internal connections (not shown) in order to conduct the aforementioned priority and compliance based message traffic shaping. For example, message processors 208A-C may utilize these connections to designate a "leader" message processor and associated leader egress function that can be configured to oversee and coordinate the traffic shaping process. In some embodiments, the designated leader message processor may request message traffic rates to a particular server from the other "follower" message processors (and/or associated "follower" egress functions). The leader message processor (and/or associated leader egress function) may then be configured to aggregate their responses (i.e., message traffic rates) and broadcast/distribute the aggregated result to all of the follower message processors (and/or follower egress functions) so that each of these follower message processors (and/or egress functions) may execute the traffic shaping process. Notably, the leader egress function does not communicate the dynamic update data to all of the ingress functions, but rather this is the responsibility of each egress function alike to provide the dynamic update information to its own ingress function(s). More specifically, all of the egress functions (e.g., egress functions 212A-C) are performing in concert to collectively act as the egress function of DSR 202. In some embodiments, this same manner of operation may be executed by a multi-DSR system as well.

In some embodiments, the decision to discard message traffic (as well as the extent/amount of message traffic to discard) may be driven by scenarios in which one or more message processors in DSR 202 experience an overload condition. Notably, if a message processor is experiencing a CPU overload condition, message traffic may be discarded by the ingress function. For example, all message traffic in excess of the engineered capacity of DSR 202 may be discarded if DSR 202 goes into CPU congestion (e.g., a predefined level/percentage of CPU utilization). Notably, this excess may be used to calculate the aggregate target message discard rate to be used for shaping the message traffic. Accordingly, the disclosed subject matter can be utilized for self-protection in a manner similar to the peer overload protection.

In the embodiment shown in FIG. 2, each of ingress functions 210A-D may be provisioned with client profile data (e.g., a client profile database 122 as shown in FIG. 1) that indicates committed message traffic rates associated with one or more of MMEs 204A-C. For example, each of MMEs 204A-C may be committed service of 5000 messages per second (mps) by DSR 202. Thus, as long as an MME 204 sends message traffic at a rate equal to or less than 5000 mps, that MME 204 will be designated by the ingress function as a "compliant client entity" and its respective message traffic will be designated as "compliant" In some embodiments, a receiving ingress function 210 may "color" the message traffic from a compliant client as "green". In the event an MME 204 produces a message traffic rate that exceeds the committed rate of 5000 mps, then a receiving ingress function 210 may designate that MME 204 as a "non-compliant client entity" and its message traffic as "non-compliant." In some embodiments, a receiving ingress function 210 may "color" the message traffic from a non-compliant client as "yellow". As indicated above, ingress function 210 may be configured to either i) classify all traffic received from a non-compliant client as a non-compliant message traffic or ii) classify only the message traffic in excess of a committed service rate (e.g., message traffic in excess of 5000 mps) from a non-compliant client as non-compliant. As shown in FIG. 2, application 230 (e.g., a software application local to DSR 202) may function as a client entity that directs request messages to a server entity, e.g., HSS 206. Notably, application 230 may have its message traffic classified or colored in the same manner as traffic that originates from MMEs 204A-C as disclosed above. In some embodiments, a message processor can also serve as a source of message traffic to another message processor. For example, a client entity may be communicatively connected to a first message processor, but the target server entity for the first message processor's traffic could be connected to a second message processor. Notably, the egress function of the first message processor may function as the client entity for the second message processor's ingress function.

In some embodiments, each of ingress functions 210A-D may also include a packet inspection module (e.g., similar a PIM 124 as shown in FIG. 1) that allows a ingress function 210 to determine the type of message (and/or the message content) received from one of MMEs 204A-C. Based on its assessment (which is configurable by a system administrator), ingress function 210 may assign a priority level (e.g., P0, P1, P2, and P3) to a received message.

Upon receiving messages from MMEs 204A-C, each of ingress functions 210A-C may classify the message traffic (in accordance with current priority and client compliance designations) and forward the classified message traffic to an egress function 212. For example, in some embodiments, message traffic received by egress functions 212A-C from ingress functions 210A-C may be classified as one of eight traffic shaping group designations, including Priority0:Compliant, Priority1:Compliant, Priority2:Compliant, Priority3: Compliant, Priority0: Non-compliant, Priority1:Non-compliant, Priority2:Non-compliant, and Priority3:Non-compliant. As mentioned above, one of egress functions 212A-C may be designated as a leader egress function (e.g., 212B) and is communicatively connected to the remaining "secondary" or "follower" egress functions (e.g., 212A and 212C). Accordingly, the leader egress function 212B is aware of the type of message traffic directed toward target HSS 206 and that originates from MMEs 204A-C.

In some embodiments, each egress function 212 may include a traffic assessment module (e.g., similar to TAM 116 as shown in FIG. 1) that is responsible for controlling and managing the rate of message traffic directed to HSS 206 (and other target server entities). For example, a traffic assessment module permits an egress function 212 to determine an aggregated message traffic rate attributable to the message traffic directed to HSS 206 from MMEs 204A-C. Upon determining the aggregated message traffic rate, a leader egress function (e.g., egress function 212B) may i) send the aggregated message traffic rate to the other egress functions 212A and 212C and ii) be utilized to ascertain if the aggregated message traffic rate exceeds the message processing capacity threshold value associated with target HSS 206. If the aggregated message traffic rate does not exceed the threshold value, then egress function 212B forwards all of the received message traffic directed to HSS 206. However, if the aggregated message traffic rate does exceed the threshold value, then egress function 212B utilizes the traffic assessment module to provide the aggregated message traffic rate and the message processing capacity threshold value to each of egress functions 212A and 212C so that each of these egress functions may forward this dynamic update data to ingress function 210A and ingress function 210C, respectively (i.e., while egress function 212B sends the dynamic update data to ingress function 210B).

As indicated above, each egress function 212A-C may include a server configuration data store (e.g., similar to server configuration data store 118 depicted in FIG. 1) that contains operation parameters associated to a plurality of server entities, including HSS 206, which is serviced by DSR 202. The server configuration data store may include a database that maps the plurality of server entities to message processing capacity threshold values (e.g., values indicative of maximum message traffic rates handled by each server entity). As an example, egress function 212B may include a server configuration data store that includes a record entry indicating that HSS 206 is configured to receive 20,000 messages per second (mps). However, in some scenarios, MMES 204A-C may collectively direct 40,000 mps to HSS 206 via DSR 202. In an attempt to avoid instructing ingress functions modules 210A-D (as a group) to discard the excess 20,000 mps (which is directed to HSS 206) in an arbitrary manner, egress function 212B may be configured to provide dynamic update data to ingress functions 210A-D for purposes of strategically discarding message traffic directed to HSS 206. For example, egress function 212B may determine (via communications with egress functions 212A and 212C, e.g., via an internal connection or bus) that ingress function 210A is directing 5,000 mps to HSS 206, ingress function 210B is directing 10,000 mps to HSS 206, and ingress function 210C is directing 25,000 mps to HSS 206. Accordingly, egress function 212B may calculate that the aggregated message traffic amounts to 40,000 mps. After calculating this total aggregated message traffic rate value, egress function 212B (e.g., via a TAM) may access configuration data to procure and/or determine the message processing capacity threshold value associated with HSS 200. In some embodiments, egress function 212B may then be configured to send both the aggregated message traffic rate and the threshold value to egress functions 212A and 212C, which then subsequently forward the received data to ingress functions 210A and 210C, respectively. In some embodiments, the aggregated message traffic rate may be categorized in accordance to traffic shaping group rates. After receiving the aggregated message traffic rate and the threshold value, each ingress function may calculate its own contribution toward the total aggregate traffic rate. For example, ingress function 210A may determine an individual contribution percentage by dividing the amount of its traffic output (e.g., 5000 mps) by the amount of the total aggregated message traffic rate (e.g., 40,000 mps) to determine that ingress function 210A is sending 12.5% of the aggregated traffic. Ingress function 210A may then be configured to determine that it needs to discard 12.5% of its traffic output (e.g., 5000 mps-625 mps=4375 mps) in order for the aggregate message traffic rate to be reduced to a level that complies with the message processing capacity threshold value (i.e., assuming ingress functions 210B and 201C perform similar calculations).

In some alternate embodiments, the target message discard rate for each of the ingress functions may be determined by egress function 212B, which calculates the individual contribution percentage to the aggregate message traffic rate and multiplies the calculated percentage with the amount in which the aggregated message traffic rate exceeds the message processing capacity threshold value associated with HSS 206 (e.g., 20,000 mps). For example, the target message discard rate for each of ingress functions 210A-C equals 2500 mps, 5000 mps, and 12,500 mps, respectively.

Regardless of where (i.e., at the egress function or the ingress functions) the target message discard rate is determined, DSR 102 is able to effectively throttle the message traffic rate forwarded to HSS 206. At some point in time before or during the target message discard rates are determined, egress function 212B or OAM server element 240 may send a traffic shaping profile to each of ingress functions 210A-C. In some embodiments, the traffic shaping profile may include the traffic shaping policy (e.g., a priority within compliance policy or a compliance within priority policy) to be used by the traffic shaping module supported by the ingress function. Moreover, the traffic shaping profile may further include message priority and client compliance designations for message traffic that is directed to target HSS 206 from any one of the MMEs 204A-C. In this particular example, application 230 is functioning as a client entity but is not generating any message traffic so ingress function 210D will determine its own target message discard rate (or receive a target message discard rate from the egress function) to be equal to 0 mps.

After traffic shaping policies are established, each of egress function 212A-C may provide the traffic shaping profile to ingress functions 210A-C, respectively. In some embodiments, an OAM server component 240 is responsible for providing and/or provisioning the static configuration information to the ingress functions. Upon receiving the traffic shaping profile (which includes the traffic shaping policy and the priority and compliance designations), each of ingress functions 210A-C may utilize the contents of traffic shaping profile and/or the dynamic update data provided by the egress functions to initiate the shaping of the message traffic received from MMEs 204A-C. For example, as message traffic is received from MME 204A, ingress function 210A may utilize a packet inspection module to determine the source and destination of the received message (e.g., MME 104A and HSS 206) and the priority level of the message. Using this information, ingress function 210A may utilize a traffic shaping module to group and classify all of the traffic received from MME 204A. For example, the traffic shaping module may organize the received message traffic originating from MME 204A and directed to HSS 206 into different priority-compliance designation groups. An example of this grouping is described below and illustrated in FIG. 3.

Figure 3:
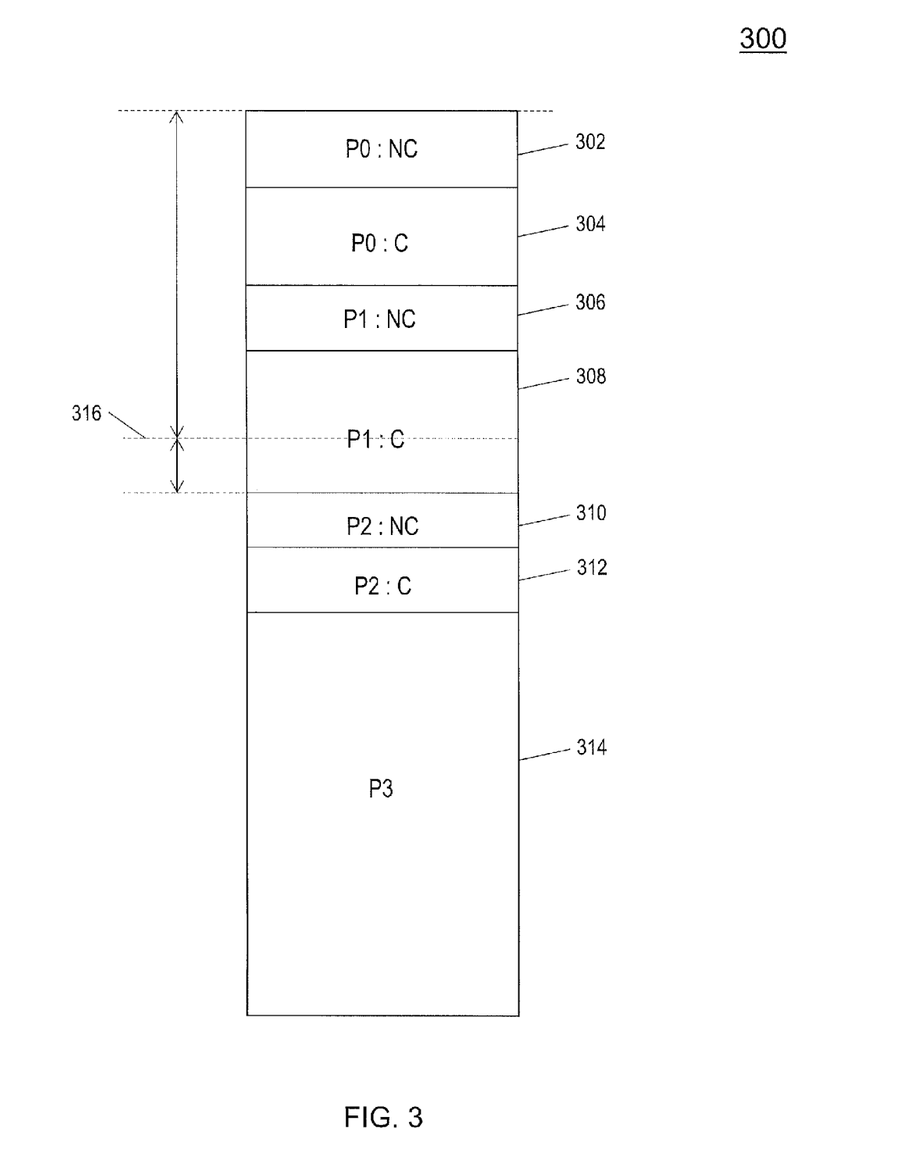
FIG. 3 is a diagram illustrating a logical representation of message traffic subjected to priority and compliance based message traffic shaping according to an embodiment of the subject matter described herein.

Returning to FIG. 2, after organizing the received message traffic into the specified priority-compliance designation groups/sections as illustrated in FIG. 3, the traffic shaping module in ingress function 210A may calculate and apply an individual target message discard rate to its own outgoing message rate to identify the message traffic to retain. Specifically, message traffic associated with the individual target message discard rate may either be discarded or marked for rerouting (e.g., to a predefined alternate target destination) by ingress function 210A. As discussed above with respect to FIG. 1, in some embodiments, each ingress function 210A-C may be configured to determine its respective contribution to each of the specific traffic shaping group designations present within the aggregated message traffic rate directed to egress functions 212A-C.

The retained message traffic is then forwarded to HSS 206. Notably, if the aggregated message traffic rate received by egress functions 212A-C from ingress functions 210A-C still exceeds the message processing capacity threshold value associated with server entity 106, egress function 212B may subsequently utilize its traffic assessment module to generate new dynamic update data to be provided to ingress functions 210A-C as updated feedback.

FIG. 3 depicts a logical representation of message traffic that is shaped by an ingress function (e.g., ingress function 210B in FIG. 2). In some embodiments, message traffic stack 300 includes a plurality of priority-compliance designation groups and/or sections, including Priority0:Non-compliant message traffic section 302, Priority0:Compliant message traffic section 304, Priority1:Non-compliant message traffic section 306, Priority1:Compliant message traffic section 308, Priority2:Non-compliant message traffic section 310, Priority2:Compliant message traffic section 312, Priority3:Compliant message traffic section 314. As shown in FIG. 3, all the message traffic rate sections are "stacked" upon each other with the highest (e.g., most important) message traffic positioned at the bottom of the message traffic stack 300. In one example, message traffic stack 300 may represent the message traffic rate generated by ingress function 210B (i.e., 10,000 mps).

FIG. 3 further illustrates an individual target message discard rate line 316 that is determined by an ingress function. For example, an ingress function may receive an aggregated message traffic rate determined by an egress function along with a message processing capacity threshold value (e.g., a target rate) associated with the destination server entity. Upon the receipt of this dynamic update data, the ingress function may then determine the aggregate target message discard rate, which in turn can be used along with the aggregated message traffic rate (and the ingress function's individual message traffic output rate) to determine the ingress function's contribution (e.g., percentage) to the aggregated message traffic received at the egress function. Such a percentage or contribution amount may then be applied to the aggregated message traffic rate to determine the ingress function's individual target discard rate.

Returning to FIG. 3 and using the example referenced above with respect to FIG. 2, target message discard rate line 316 may indicate the point in message traffic stack 300 that equates to 5000 mps. Notably, the amount of message traffic located below target message discard rate line 316 in FIG. 3 represents message traffic that is retained and communicated to egress function 212B (or response traffic accepted by ingress function 108 from egress function 110). Using discard rate line 316 as an example, messages classified as belonging to priority-compliance designation sections 302-306 will be discarded by ingress function 210B because these sections are located entirely above discard rate line 316. Likewise, messages classified as belonging to priority-compliance designation sections 310-314 will be accepted and communicated because these sections are located entirely below the discard rate line 316.

As illustrated in FIG. 3, target message discard rate line 316 falls somewhere in the middle of priority-compliance designation section 308. Accordingly, a message belonging to this section may be accepted or discarded. Ultimately, the decision to discard or accept the message will be based on the relationship or ratio existing between the offered traffic segment rate and the total offered traffic segment rate. For example, if the discard rate line 316 falls exactly in the middle (e.g., at the 50% mark) of section 308, then 1 out of every 2 received messages will be accepted due to the 1:1 ratio (keep/discard). Similarly, if the discard rate line 316 falls exactly at the first quarter mark (e.g., at the 25% mark from the bottom) of section 308, then 1 out of every 4 messages will be retained due to the 1:3 keep/discard ratio.

By employing such a traffic shaping management system, a system administrator is able to strategically discard message traffic based on both message priority and the compliance level of the client. Notably, a system administrator is able to classify message traffic in accordance with a color within priority policy (i.e., wherein message traffic is first prioritized via message priority and subsequently prioritized via client compliance) or a priority-within-color system (i.e., wherein message traffic is first prioritized via client compliance and subsequently prioritized via message priority). FIG. 3, for example, depicts a color-within-priority policy where the message priority level is considered first, after which client compliance level can be considered. In some embodiments, a client compliance-only policy or a priority-only policy may be used.

In some embodiments, ingress functions may be configured to never discard any answer or response messages. Notably, it may be preferable for answer messages and response messages to be passed through unaffected so that transaction in progress may complete even if new request messages have to be dropped. Thus, the answer messages will still consume capacity (and affect other traffic and traffic rates) but not be discarded. However, the number of answer messages will be controlled by the reduction in the number of request messages that may trigger a respective number of answer messages. In some alternate embodiments, first responder traffic (e.g., both Diameter request messages and corresponding answer messages associated with first responder emergency entities, such as police, firefighters, emergency medical technicians, disaster relief personnel, etc.) may be passed through unaffected. However, in order to protect the message processors of DSR 202 from overload conditions from excess message traffic only a designated percentage of traffic may be passed through in this manner. Additionally, the ingress functions may be configured to de-prioritize other message traffic, such as regular message requests and corresponding answer messages.

Figure 4:
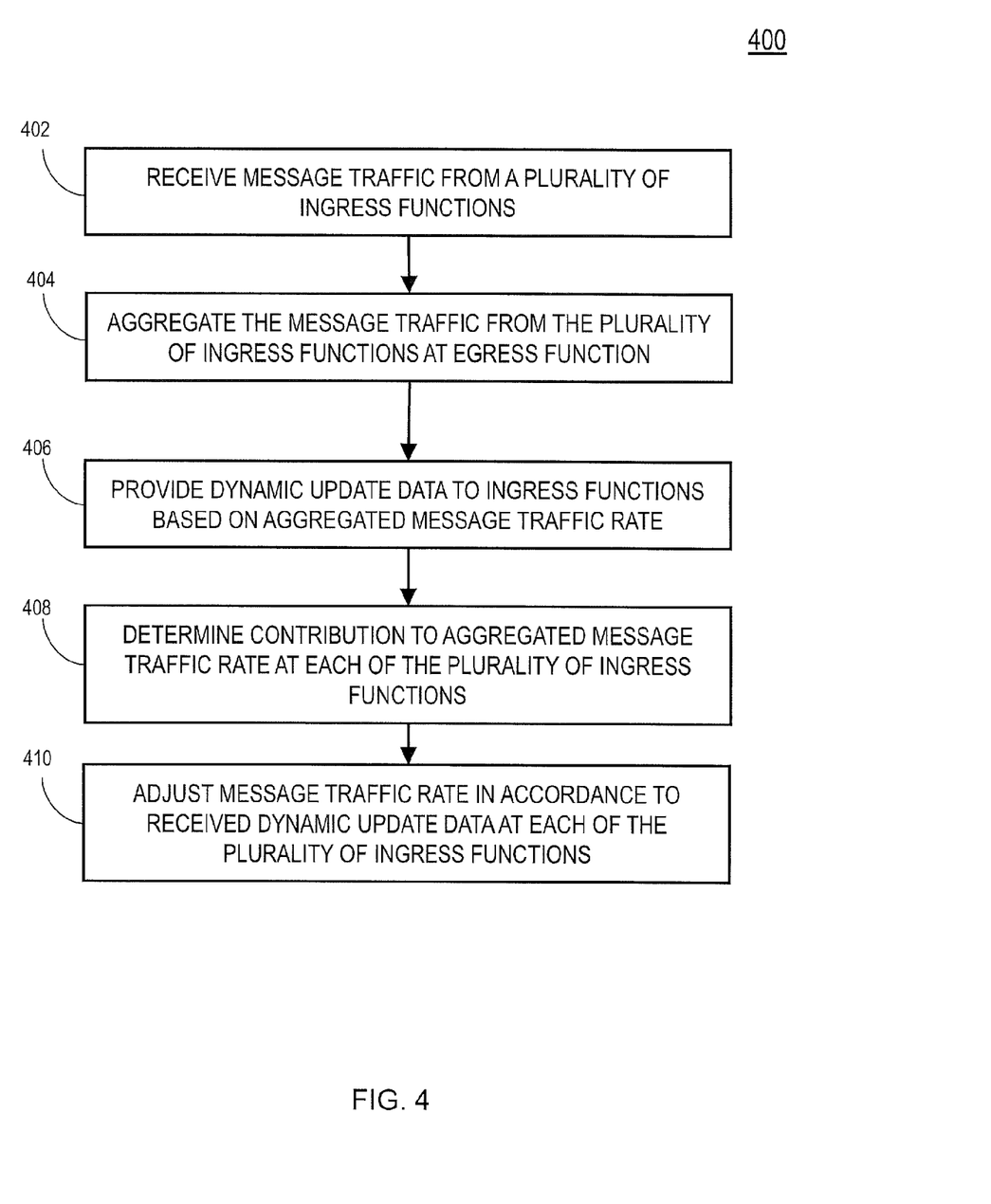
FIG. 4 is a flow chart illustrating an exemplary process for conducting priority and compliance based message traffic shaping according to an embodiment of the subject matter described herein.

FIG. 4 illustrates a method 400 for conducting priority and compliance based message traffic shaping in accordance with embodiments of the subject matter described herein. The following method is also described with respect to system 100 in FIG. 1 as an exemplary embodiment.

In step 402, message traffic is received from a plurality of ingress functions. In some embodiments, egress function 110 may receive message traffic (e.g., Diameter request messages) that is directed toward server entity 106 from ingress functions 108A-C.

In step 404, the message traffic from the plurality of ingress functions is aggregated. In some embodiments, egress function 110 may be configured to aggregate or combine all of the message traffic that is being directed to server 106 from client entities 104A-C (via ingress functions 108A-C). Notably, egress function 110 may determine whether the aggregated message traffic rate exceeds a threshold limit message rate associated with server entity 106. For example, upon calculating the aggregated message traffic rate, egress function 110 may compare the calculated aggregated message traffic rate with a predefined message processing capacity threshold value that is stored locally within (or accessible by) egress function 110.

In step 406, dynamic update data is provided to ingress functions based on the aggregated message traffic rate. In the event egress function 110 determines that the aggregated message traffic rate exceeds the message processing capacity threshold value associated with server entity 106, egress function 110 may provide the aggregated message traffic rate and the message processing capacity threshold value to the ingress functions, such that each ingress function can calculate an individual target discard rate that can be used to strategically reduce the amount of message traffic directed by each of the ingress functions 108A-C (along with a locally stored traffic shaping policy establishing criteria corresponding to the client compliance levels and the message priority levels). In some embodiments, the dynamic update data may be categorized in accordance with traffic shaping group rates.

In step 408, the outgoing message traffic rate sent by each ingress function is adjusted in accordance with the received dynamic update data. In some embodiments, each ingress function 108 may discard (or reroute) message traffic based on the calculated individual target message discard rate as well as a locally traffic shaping policy included in the received traffic shaping profile. In some embodiments, an ingress function 108 may respond to the discarded message traffic with an answer message to the client entity indicating a server or message processor overload condition (if applicable). In yet another embodiment, an ingress function 108 may respond to a predefined percentage of discarded requests with an answer message such that the generation of answer message traffic does not contribute to an existing overload condition. By adjusting the message traffic rate according to the traffic shaping profile, egress function 110 receives message traffic at a rate that will not create substantial congestion for server entity 106.

In some embodiments, a minimum generation rate of Answers (e.g., one answer per second) to any particular client entity may be guaranteed and/or established such that the client entity can receive at least some periodic information regarding the throttling of request messages originating from the client entity. Namely, this type of algorithm for deploying answers at a particular rate may be required when, for example, i) the traffic shaping as described in the above examples is operating on aggregated traffic originating from multiple client entities and ii) the traffic shaping may result not responding to some particular client at all even though the configured percentage of answers to requests may be satisfied.

It will also be appreciated that exemplary method 400 is for illustrative purposes and that different and/or additional actions may be used. It will also be appreciated that various actions described herein may occur in a different order or sequence.

Figure 5:
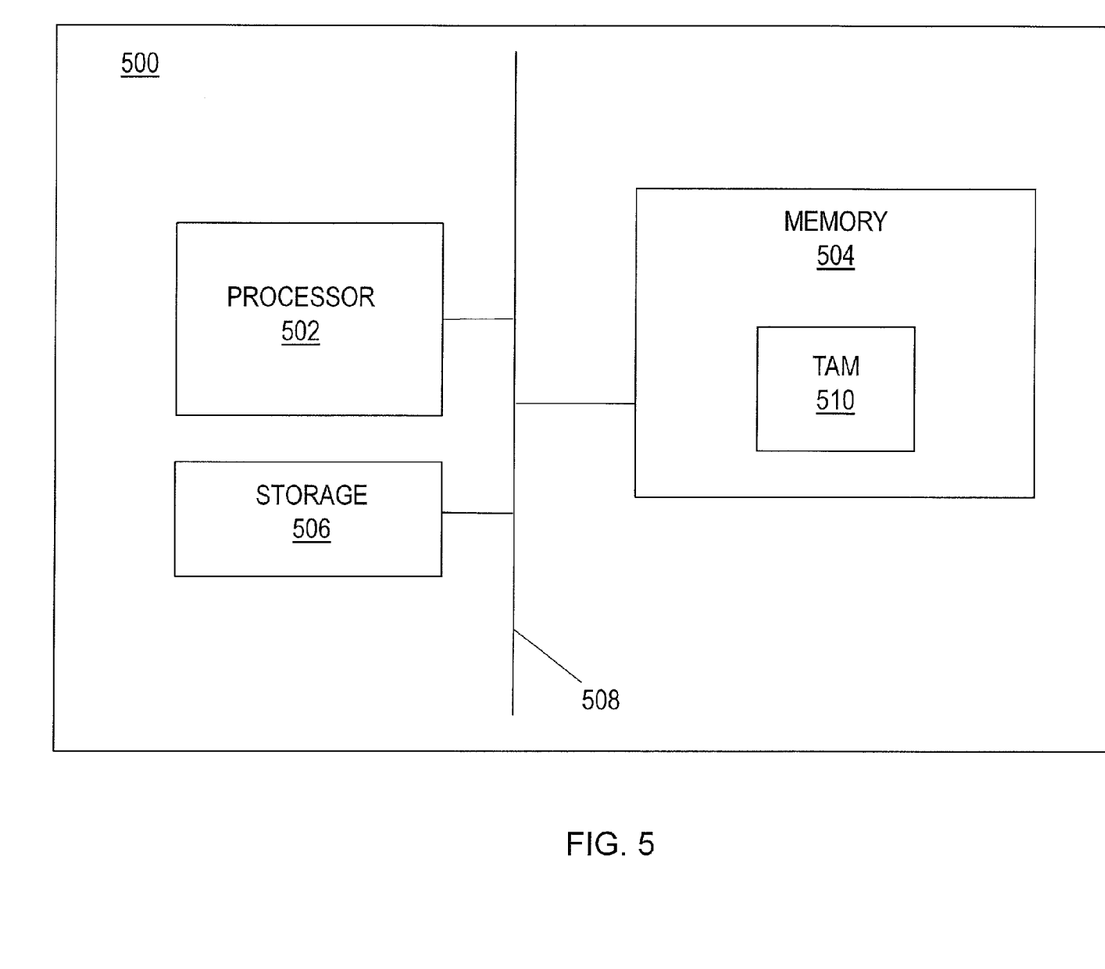
FIG. 5 is a block diagram of a computer system suitable for use in performing the functions described herein.

FIG. 5 depicts a high level block diagram of a computer system suitable for use in performing the functions described herein. As depicted in FIG. 5, system 500 comprises a processor 502, a memory 504, a storage device 506, and communicatively connected via a system bus 508. In some embodiments, processor 502 can comprise can comprise a microprocessor, central processing unit (CPU), or any other like hardware based processing unit. In some embodiments, a traffic assessment module (TAM) 510 (or, alternatively, a traffic shaping module) can be stored in memory 505, which can comprise random access memory (RAM), read only memory (ROM), optical read/write memory, cache memory, magnetic read/write memory, flash memory, embedded memory, or any other like non-transitory computer readable medium. In some embodiments, processor 502 and memory 504 can be used to execute and manage the operation of OPE 510. In some embodiments, storage device 506 can comprise any storage medium or storage unit that is configured to store data accessible by processor 502 via system bus 508. Exemplary storage devices can comprise one or more local databases hosted by system 500.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for conducting priority and compliance based message traffic shaping, the method comprising:
   aggregating, by an egress function, message traffic originated by a plurality of client entities and directed to a target server entity via a plurality of ingress functions;
   procuring, by the egress function, dynamic update data that includes a message processing capacity threshold value associated with the target server entity and an aggregated message traffic rate corresponding to the message traffic received from the plurality of ingress functions;
   sending the dynamic update data to each of the plurality of ingress functions; and
   adjusting, by each of the ingress functions, an outgoing message traffic rate directed to the target server entity in accordance with the dynamic update data, wherein adjusting the outgoing message traffic rate includes discarding, at each of the ingress functions, incoming message traffic received from client entities in accordance with the dynamic update data and a stored traffic shaping profile that includes message priority designations and compliance designations for each of the client entities.

2. The method of claim 1 wherein each of the ingress functions is configured to determine an aggregate target message discard rate by calculating the difference between the message processing capacity threshold value and the aggregated message traffic rate.

3. The method of claim 2 wherein each of the ingress functions determines its own discard rate utilizing the aggregate target message discard rate and its own outgoing message traffic rate.

4. The method of claim 1 wherein the stored traffic shaping profile further includes a traffic shaping policy that specifies a priority-within-client compliance policy, a client compliance-within-priority policy, a client compliance-only policy, or a priority-only policy.

5. The method of claim 1 wherein the dynamic update data is categorized in accordance with traffic shaping group rates.

6. The method of claim 5 wherein the outgoing message traffic rate associated with each of the ingress functions is adjusted in accordance with the traffic shaping group rates.

7. The method of claim 1 wherein each of the ingress functions and egress function comprises a message processor in one or more Diameter signaling routers (DSRs).

8. The method of claim 1 wherein the ingress functions and egress function are contained in a single message processor.

9. The method of claim 1 wherein message processing capacity threshold value is a value that varies based on one or more dynamic conditions.

10. The method of claim 9 wherein the dynamic conditions include pending transactions, a communication failure between one or more of the ingress functions and the egress function, and feedback information from the target server entity.

11. The method of claim 1 wherein the egress function is one of a plurality of egress functions and is configured to procure the dynamic update data by receiving a message traffic rate from each of the plurality of egress functions, determining aggregated message traffic rate data based on the received message traffic rates, and distributing the aggregated message traffic rate data to each of the plurality of egress functions for use in traffic shaping.

12. A system for conducting priority and compliance based message traffic shaping, the system comprising:
   a plurality of ingress functions configured to receive message traffic directed to a target server entity from a plurality of client entities; and
   an egress function configured to receive and aggregate the message traffic directed to the target server entity from the plurality of ingress functions, procure dynamic update data that includes a message processing capacity threshold value associated with the target server entity and an aggregated message traffic rate corresponding to the message traffic received from the plurality of ingress functions, and to send the dynamic update data to each of the plurality of ingress functions;
   wherein each of the ingress functions is configured to adjust an outgoing message traffic rate directed to the target server entity in accordance with the dynamic update data via discarding, at each of the ingress functions, incoming message traffic received from client entities in accordance with the dynamic update data and a stored traffic shaping profile that includes message priority designations and client compliance designations.

13. The system of claim 12 wherein each of the ingress functions is configured to determine an aggregate target message discard rate by calculating the difference between the message processing capacity threshold value and the aggregated message traffic rate.

14. The system of claim 12 wherein each of the ingress functions determines its own discard rate utilizing the aggregate target message discard rate and its own outgoing message traffic rate.

15. The system of claim 12 wherein the stored traffic shaping profile further includes a traffic shaping policy that specifies a priority-within-client compliance policy, a client compliance-within-priority policy, a client compliance-only policy, or a priority-only policy.

16. The system of claim 12 wherein the dynamic update data is categorized in accordance with traffic shaping group rates.

17. The system of claim 16 wherein the outgoing message traffic rate associated with each of the ingress functions is adjusted in accordance with the traffic shaping group rates.

18. The system of claim 12 wherein each of the ingress functions and egress function comprises a message processor in one or more Diameter signaling routers (DSRs).

19. The system of claim 12 wherein the ingress functions and egress function are contained in a single message processor.

20. The system of claim 12 wherein message processing capacity threshold value is a value that varies based on one or more dynamic conditions.

21. The system of claim 20 wherein the dynamic conditions include pending transactions, a communication failure between one or more of the ingress functions and the egress function, and feedback information from the target server entity.

22. The system of claim 12 wherein the egress function is one of a plurality of egress functions and is configured to procure the dynamic update data by receiving a message traffic rate from each of the plurality of egress functions, determining aggregated message traffic rate data based on the received message traffic rates, and distributing the aggregated message traffic rate data to each of the plurality of egress functions for use in traffic shaping.

23. A non-transitory computer readable medium having stored thereon executable instructions that when executed by the processor of a computer cause the computer to perform steps comprising:aggregating, by an egress function, message traffic directed to a target server entity from each of a plurality of ingress functions;

procuring, by the egress function, dynamic update data that includes a message processing capacity threshold value associated with the target server entity and an aggregated message traffic rate corresponding to the message traffic received from the plurality of ingress functions;

sending the dynamic update data to each of the plurality of ingress functions; and adjusting, by each of the ingress functions, an outgoing message traffic rate directed to the target server entity in accordance with the dynamic update data, wherein adjusting the outgoing message traffic rate includes discarding, at each of the ingress functions, incoming message traffic received from client entities in accordance with the dynamic update data and a stored traffic shaping profile that includes message priority designations and client compliance designations.

* * * * *

UNITED STATES PATENT AND TRADEMARK OFFICE
CERTIFICATE OF CORRECTION

PATENT NO. : 9,515,932 B2  
APPLICATION NO. : 14/616611  
DATED : December 6, 2016  
INVENTOR(S) : Zaidi et al.

Page 1 of 1

It is certified that error appears in the above-identified patent and that said Letters Patent is hereby corrected as shown below:

In the Specification

In Column 6, Line 64, after "the" delete "of".

In Column 10, Line 15, delete "that that" and insert -- that --, therefor.

In Column 11, Line 61, delete "Priority0: Non" and insert -- Priority0:Non --, therefor.

In the Claims

In Column 18, Line 61, in Claim 14, delete "claim 12" and insert -- claim 13 --, therefor.

In Column 20, Line 7, in Claim 23, delete "comprising:aggregating," and insert -- comprising: aggregating, --, therefor.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*